United States Patent
Pan et al.

(10) Patent No.: US 9,578,458 B2
(45) Date of Patent: Feb. 21, 2017

(54) IDENTIFICATION OF ROGUE ACCESS POINTS

(71) Applicant: Intel Corporation, Santa Clara, CA (US)

(72) Inventors: Xiaoyong Pan, Shanghai (CN); Justin Lipman, Shanghai (CN); Robert A. Colby, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,464

(22) PCT Filed: Jul. 19, 2013

(86) PCT No.: PCT/CN2013/079700
§ 371 (c)(1),
(2) Date: Dec. 26, 2013

(87) PCT Pub. No.: WO2015/006979
PCT Pub. Date: Jan. 22, 2015

(65) Prior Publication Data
US 2016/0192136 A1    Jun. 30, 2016

(51) Int. Cl.
*H04W 4/02* (2009.01)
*H04W 12/12* (2009.01)
(Continued)

(52) U.S. Cl.
CPC ............ *H04W 4/023* (2013.01); *G01S 5/0205* (2013.01); *H04K 3/90* (2013.01); *H04L 61/6022* (2013.01);
(Continued)

(58) Field of Classification Search
None
See application file for complete search history.

(56) References Cited

U.S. PATENT DOCUMENTS

2004/0055477 A1* 3/2004 Swank ................. A21B 3/02
99/419
2004/0076134 A1* 4/2004 Barber ............... H04L 12/2856
370/338
(Continued)

OTHER PUBLICATIONS

International Search Report and Written Opinion received for International Application No. PCT/CN2013/079700, mailed Apr. 25, 2014, 14 pages.

*Primary Examiner* — Diane Mizrahi
(74) *Attorney, Agent, or Firm* — Barnes & Thornburg LLP

(57) ABSTRACT

Technologies for identifying rogue access points having an actual location different from a registered location include a computing device to receive a unique identifier of each access point of a plurality of access points within a communication range of the computing device from the corresponding access point. The computing device determines a registered physical location of each access point based on the unique identifier. Additionally, the computing device determines a reference distance between the computing device and each access point based on a transmitted signal received from each corresponding access point and a spatial distance between each access point and each other access point based on the registered locations of the access points. Based on the spatial distances and reference distances, the computing device identifies which of the access points are rogue access points.

23 Claims, 8 Drawing Sheets

(51) Int. Cl.
  *H04W 64/00*  (2009.01)
  *G01S 5/02*  (2010.01)
  *H04K 3/00*  (2006.01)
  *H04W 12/06*  (2009.01)
  *H04L 29/12*  (2006.01)
  *H04W 72/04*  (2009.01)
  *G01S 5/14*  (2006.01)

(52) U.S. Cl.
  CPC ............. *H04W 12/06* (2013.01); *H04W 12/12* (2013.01); *H04W 64/006* (2013.01); *H04W 72/046* (2013.01); *G01S 5/14* (2013.01)

(56) References Cited

U.S. PATENT DOCUMENTS

| | | | |
|---|---|---|---|
| 2004/0078566 A1* | 4/2004 | Barber | H04L 12/2856 713/161 |
| 2004/0078598 A1* | 4/2004 | Barber | H04L 12/2856 726/30 |
| 2005/0073979 A1* | 4/2005 | Barber | H04L 12/2856 370/338 |
| 2006/0068811 A1 | 3/2006 | Adya et al. | |
| 2006/0240840 A1 | 10/2006 | Morgan et al. | |
| 2007/0079376 A1 | 4/2007 | Robert et al. | |

\* cited by examiner

IDENTIFICATION OF ROGUE ACCESS POINTS

CROSS REFERENCE TO RELATED APPLICATIONS

This application is a national stage entry under 35 USC §371(b) of International Application No. PCT/CN2013/079700, which was filed Jul. 19, 2013.

BACKGROUND

Location-based services continue to be integrated into countless applications for mobile computing devices. Accordingly, to provide helpful services, the location of the computing device must be accurately determined. Trilateration is a method of determining a relative or geodetic location of a computing device relative to multiple reference points with known locations. For example, a computing device can attempt to determine its location using trilateration methods given its relative distances to various reference points in the area. Oftentimes, the computing device retrieves the locations of the reference points from an external public database or from the reference points themselves.

The existence of rogue reference points can significantly influence the accuracy of trilateral algorithms. An external database storing the location data regarding the reference points may have incorrect information due to human error or a malicious attack. For example, an adversary may "poison" the location database with false locations of reference points and/or induce the reference points themselves to provide false location advertisements. Based on this "poisoned" location data, the resultant location of the computing device will likely be erroneous.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
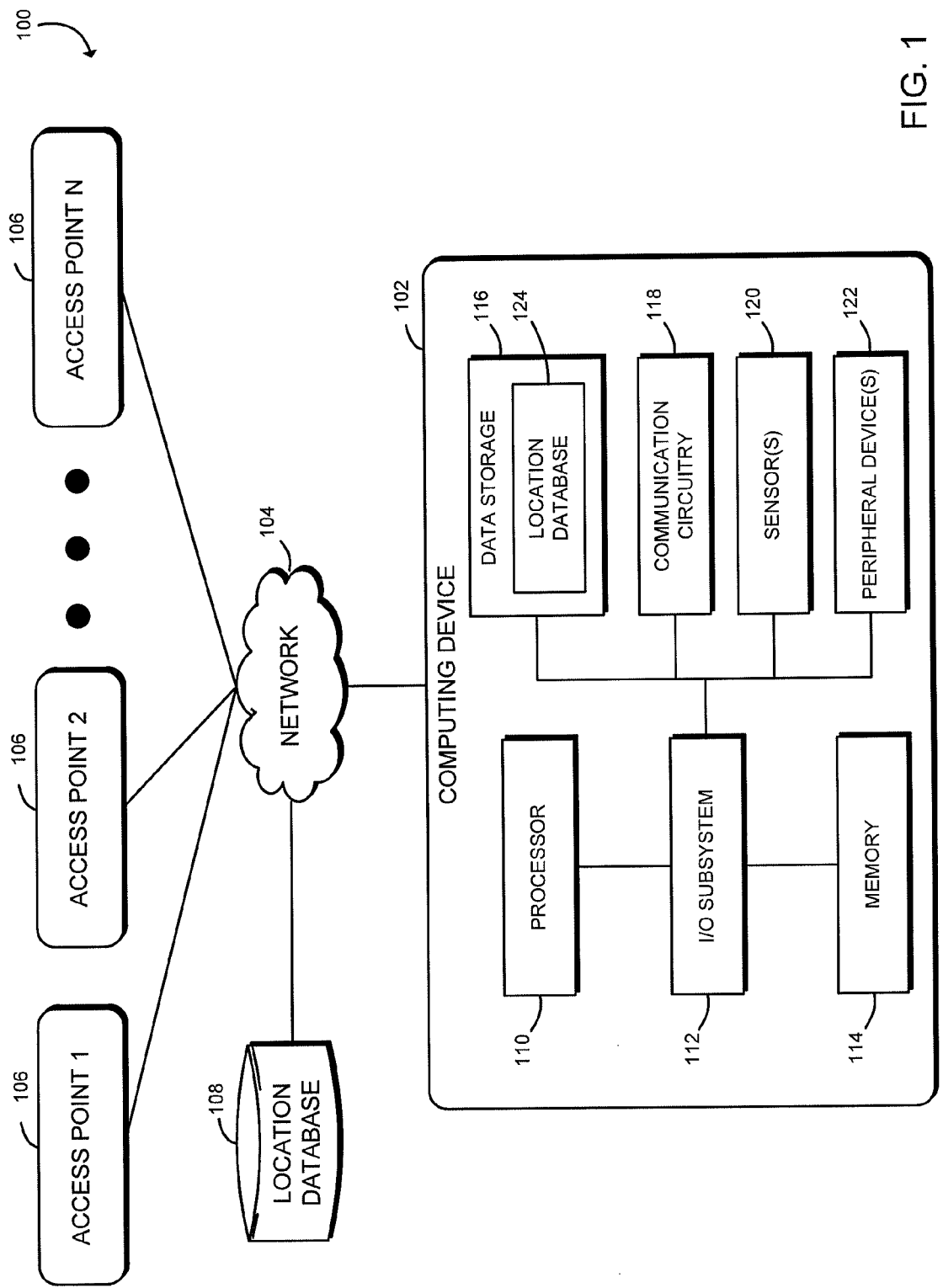
FIG. 1 is a simplified block diagram of at least one embodiment of a system for identifying rogue access points.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for identifying rogue access points includes a computing device 102, a network 104, a plurality of access points 106, and a location database 108. In use, as discussed in more detail below, the computing device 102 may be used to filter or otherwise exclude rogue access points in order to allow the computing device 102 to more accurately determine its location using, for example, trilateration techniques. The computing device 102 may be embodied as any type of computing device 102 capable of establishing a communication link with the access points 106 and performing the functions described herein. For example, the computing device 102 may be embodied as a cellular phone, smartphone, tablet computer, laptop computer, personal digital assistant, mobile Internet device, desktop computer, and/or any other computing/communication device. As shown in FIG. 1, the illustrative computing device 102 includes a processor 110, an input/output ("I/O") subsystem 112, a memory 114, a data storage 116, a communication circuitry 118, one or more sensors 120, and one or more peripheral devices 122. Of course, the computing device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. As shown in FIG. 1, the data storage 116 includes a location database 124. As discussed below, the computing device 102 may record the location of the computing device 102 after each trilateration or other location determination procedure in the location database 124. Further, sensor data related to the location or movement of the computing device 102 may be stored in the location database 124 for use, for example, in implementing the methods described herein. In some embodiments, registered location data for the access points 106 may be stored in the location database 124 and used by the computing device 102 in addition, or alternatively, to the location database 108.

The communication circuitry 118 of the computing device 102 may be embodied as any communication circuit, device, or collection thereof, capable of enabling communications between the computing device 102 and other remote devices (e.g., the access points 106) over the network 104. The communication circuitry 118 may be configured to use any one or more communication technologies (e.g., wireless or wired communications) and associated protocols (e.g., Ethernet, Bluetooth®, WiMAX, etc.) to effect such communication. As discussed below, the computing device 102 may, in some embodiments, communicate with Wi-Fi® access points with known locations to perform rogue identification and/or trilateration techniques.

The one or more sensors 120 may collect data regarding various contexts (e.g., physical, environmental, etc.) of the computing device 102. For example, the sensor(s) 120 may determine the velocity of the computing device 102, which may be recorded in the location database 124. The sensors 120 may include, for example, proximity sensors, optical sensors, light sensors, audio sensors, temperature sensors, thermistors, motion sensors, piezoelectric sensors, and/or other types of sensors. Of course, the computing device 102 may also include components and/or devices configured to facilitate the use of the sensors 120. The one or more peripheral devices 122 of the computing device 102 may include any number of additional peripheral or interface devices. The particular devices included in the peripheral devices 122 may depend on, for example, the type and/or intended use of the computing device 102.

The network 104 may be embodied as any type of telecommunication network capable of facilitating communication between the computing device 102 and the access points 106. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof. In the illustrative embodiment, the network 104 is embodied as a short-range wireless communication network or link.

The system 100 also includes a number of access points 106, which are embodied as network access points such as Wi-Fi® access points. In the illustrative embodiments, the system 100 includes at least three access points 106, which may be used to determine the location of the computing device 102 via trilateration. However, it should be appreciated that, in other embodiments, the system 100 may include a fewer or greater number of access points 106, which may be embodied as any type of computing device capable of performing the functions described herein. As such, the access points 106 may be embodied as any computing device having a registered (i.e., recorded or otherwise known) physical location. Accordingly, in some embodiments, the access points 106 may be similar to the computing device 102 as described above. For example, each access point 106 may be embodied as a server, router, network bridge, web portal device, desktop computer, cellular phone, smartphone, tablet computer, laptop computer, personal digital assistant, mobile Internet device, and/or any other computing/communication device. Further, the access points 106 may include components similar to those of the computing device 102 as described above. The description of those components of the computing device 102 is equally applicable to the description of components of the access points 106 and is not repeated herein for clarity of the description. Further, it should be appreciated that the access points 106 may include other components, sub-components, and devices commonly found in a computing device, which are not discussed above in reference to the computing device 102 and not discussed herein for clarity of the description. Additionally, the access points 106 may include components different from, or fewer than, those of the computing device 102. For example, each access point 106 may or may not include sensors 120 and/or peripheral devices 122. As discussed in detail below, the computing device 102 may utilize the registered locations of the access points 106 to determine whether any of the access points 106 are rogue access points (i.e., access points having incorrect location data associated with them). In doing so, for each access point 106, the computing device 102 determines whether the registered location data corresponding to the access point 106 is accurate. As discussed above, incorrect location data may be stored for the access point 106. As such, the system 100 permits the computing device 102 to determine whether the registered location is the same as the actual location of the access point 106.

The location database 108 may store registered location data for one or more of the access points 106, which may be retrieved by the computing device 102 to identify which, if any, of the access points 106 are rogue. Depending on the particular embodiment, the location database 108 may store relative location data regarding the access points 106 (e.g., location relative to another known location), absolute location data regarding the access points 106 (e.g., latitudinal-longitudinal geodetic coordinates), and/or a combination thereof. Accordingly, in some embodiments, the computing device 102 may retrieve location data from more than one location database 108 to determine the location of a particular access point 106. The location database 108 may be embodied as any combination of hardware, software, and/or firmware suitable for performing the functions described herein. For example, the location database 108 may be embodied as an independent database server computer in some embodiments. Additionally, although only one computing device 102, one network 104, and one location database 108 are illustratively shown in FIG. 1, the system 100 may include additional computing devices 102, networks 104, and/or location databases 108 in some embodiments. For example, the computing device 102 may retrieve location information regarding the access points 106 from multiple location databases 108 in some embodiments.

Figure 2:
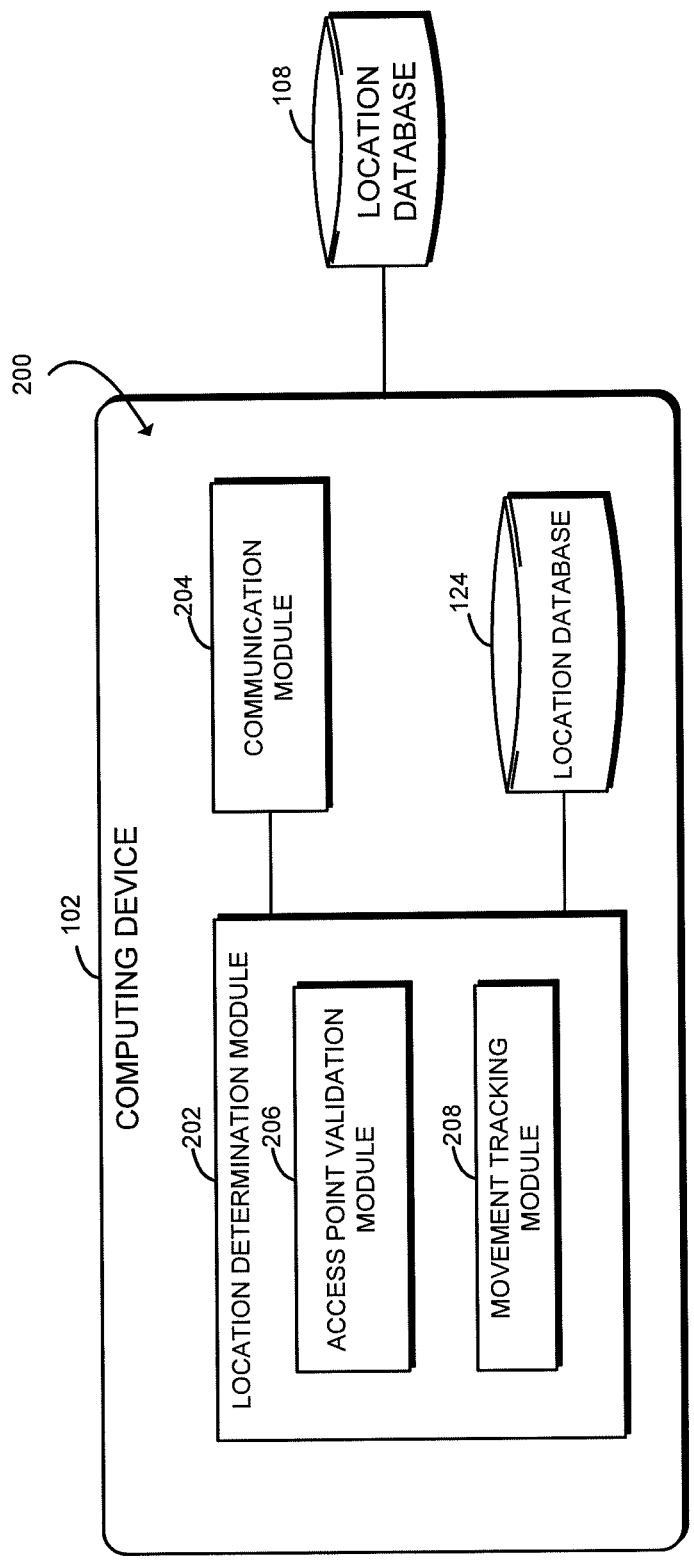
FIG. 2 is a simplified block diagram of at least one embodiment of an environment of a computing device of the system of FIG. 1.

Referring now to FIG. 2, in use, the computing device 102 of the system 100 establishes an environment 200 for identifying rogue access points. The environment 200 in the illustrative embodiment includes a location determination module 202, a communication module 204, and the location database 124. Additionally, the location determination module 202 includes an access point validation module 206 and a movement tracking module 208. Each of the location determination module 202, the communication module 204, the access point validation module 206, and the movement tracking module 208 may be embodied as hardware, software, firmware, or a combination thereof.

As discussed in more detail below, the location determination module 202 determines the location of the computing device 102 based on the locations and/or signals of the access points 106. For example, in some embodiments, the location determination module 202 implements a trilateration algorithm based on the locations and/or signals of at least three of the access points 106. In other embodiments, the location determination module 202 may use another suitable location determination technique. In doing so, the accuracy of the location determination of the computing device 102 may be improved by use of only accurate location data regarding the corresponding access points 106. Accordingly, as discussed below, the access point validation module 206 identifies which of the access points 106, if any, are rogue access points.

The communication module 204 handles the communication between the computing device 102 and remote devices (e.g., the access points 106) through the network 104. As discussed below, the communication module 204 may receive unique identifiers from a plurality of access points 106 within a communication range of the computing device 102 from the access points 106. The identifier may be embodied as any data that may be used by the computing device 102 to uniquely identify a particular access point 106. For example, a unique identifier may be embodied as a media access control (MAC) address of the particular access point 106, which is received by the communication module 204 of the computing device 102 with a beacon frame of an access point 106. Additionally, in some embodiments, one or more of the access points 106 may advertise its location using, for example, a protocol under the Institute of Electrical and Electronics Engineers (IEEE) 802.11v standard, which may be received via the communication module 204. In such embodiments, the advertised location may be used in lieu of the registered location stored in the location database 108. In another embodiment, the advertised location and the registered location may be used in conjunction with one another in determining whether the access point 106 is rogue.

The access point validation module 206 determines a registered physical location of each access point 106 based on the unique identifier of each access point 106. For example, the access point validation module 206 may query one or more of the location databases 108, 124 based on the unique identifier to retrieve location data corresponding with the location (or rogue location) of the access point 106. Additionally, the access point validation module 206 determines a spatial distance between each access point 106 and one or more other access points 106 based on the retrieved registered locations of the access points 106. In determining the spatial distance between two access points 106, the access point validation module 206 may compare the registered locations of the two access points 106. For example, in an embodiment involving three access points 106 (e.g., A, B, and C), the access point validation module 206 determines the spatial distance between A and B, between B and C, and between A and C. The access point validation module 206 may utilize any suitable algorithm and/or other data (e.g., map data, distance data, vector data, etc.) to determine the spatial distance between the access points 106.

The access point validation module 206 also determines a reference distance between the computing device 102 and each access point 106 based on a transmitted signal received from each corresponding access point 106. The reference distance indicates the distance between the computing device 102 and the access point 106 and may be determined, for example, based on the received signal strength and/or the time of flight of the transmitted signal. In one embodiment, the access point validation module 206 utilizes free-space path loss in determining the reference distance between the computing device 102 and the access point 106. Based on the spatial distances and the reference distances, the access point validation module 206 identifies which access points 106 are rogue access points. In doing so, the access point validation module 206 may determine the degree of correlation of each access point 106 as described herein. In another embodiment, the access point validation module 206 may determine whether the access points 106 are rogue based on movement of the computing device 102 and/or a pre-established safe area for access points 106 as discussed below. In some embodiments, the access point validation module 206 may tag, flag, mark, or otherwise identify the rogue access points as such so that those access points 106 are not used in location determination applications and services, for example.

The movement tracking module 208 may track the movement and/or other inertial characteristics of the computing device 102. For example, the movement tracking module 208 may store the location of the computing device 102 after each determination (e.g., trilateration). Further, the movement tracking module 208 may determine the movement or possible movement of the computing device 102 since the computing device 102 was located at a previously stored location. In doing so, the movement tracking module 208 may use one or more of the sensors 120. For example, in one embodiment, the velocity of the computing device 102 may be sensed and used to calculate the possible movement of the computing device 102 since the computing device 102 was located at the previous location. In doing so, the movement tracking module 208 may multiply the velocity times the amount of time elapsed since the computing device 102 was located at the previously stored location. In some embodiments, an average or assigned speed (e.g., two meters per second for humans) may be utilized. In yet another embodiment, the access point 106 density (i.e., average distance between neighbor access points 106) in the area around the computing device 102 may be used to determine the movement or possible movement of the computing device 102.

Figure 3:
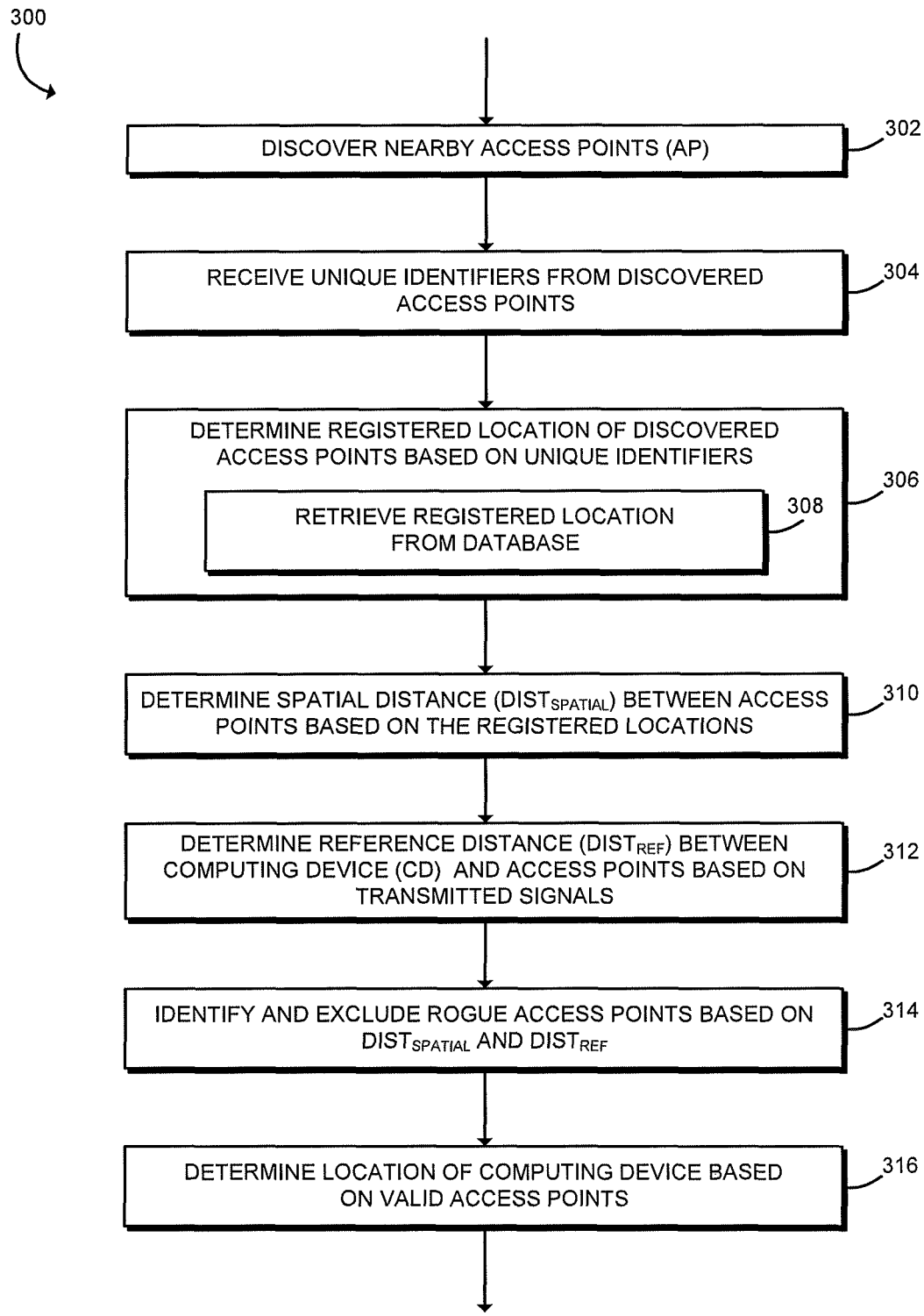
FIG. 3 is a simplified flow diagram of at least one embodiment of a method for identifying rogue access points on the computing device of the system of FIG. 1.

Referring now to FIG. 3, in use, the computing device 102 of the system 100 may execute a method 300 for identifying rogue access points. The illustrative method 300 begins with block 302 in which the computing device 102 discovers nearby access points 106. For example, the access points 106 may transmit beacon frames over a wireless network 104, which may be received by the computing device 102. In another embodiment, the computing device 102 transmits an interrogatory signal resulting in a response from nearby (i.e., within a communication range) access points 106. As discussed above, a variety of communication protocols and networks 104 may be utilized in different embodiments. Accordingly, the communication range of the computing device 102 may vary depending on the characteristics of the particular communication system. Of course, in other embodiments, another method of discovering the nearby access points 106 may be employed. It should be appreciated that some access points 106 may be within communication range of the computing device 102 but not provide a unique identifier to the computing device 102. Accordingly, those access points 106 may be ignored by the computing device 102.

In block 304, the computing device 102 receives unique identifiers from the discovered access points 106. As discussed above, the unique identifier may be, for example, a MAC address of the access point 106. Based on the unique identifiers received from the access points 106, the computing device 102 determines the registered location of those access points 106 in block 306. In doing so, in block 308, the computing device 102 may, for each access point 106, retrieve location data indicative of the registered physical location of the access point 106 from the location database 108. As discussed above, in some embodiments, the access point 106 may advertise or otherwise broadcast its location using, for example, an IEEE 802.11v protocol. In such an embodiment, the broadcasted location may be used alternative, or in addition, to the registered physical location from the location database 108.

In block 310, the computing device 102 determines the spatial distance between access points 106 based on the registered locations of the access points 106. Specifically, the computing device 102 determines the spatial distance between each access point 106 and each other access point 106 potentially used in a location determination of the computing device 102 (e.g., via trilateration). In other embodiments, the computing device 102 may determine a subset of those spatial distances. That is, the access points 106 used in a location determination of the computing device 102 may be a subset of (i.e., all or a portion of) the access points 106 for which, for example, a unique identifier has been received. As discussed above, in determining the spatial distance between two access points 106, the computing device 102 may compare the registered locations of the two access points 106. The spatial distance between an access point 106, $AP_i$, and an access point 106, $AP_j$, may be represented herein as $DIST_{SPATIAL}(AP_i, AP_j)$ for simplicity.

In block 312, the computing device 102 determines the reference distance between the computing device 102 and each access point 106 based on a transmitted signal received from each corresponding access point 106. As discussed above, the reference distance may be determined based on the received signal strength and/or the time of flight of the transmitted signal of the transmitted signal. That is, the strength of the signal received by the computing device 102 from an access point 106 may vary (e.g., diminish) as the distance between the computing device 102 and the access point 106 changes (e.g., increases). Accordingly, the computing device 102 may utilize, for example, a known function for the signal strength and/or lookup table to determine the distance between the computing device 102 and the access point 106. In one embodiment, the computing device 102 utilizes a free-space path loss model in determining the reference distance. Alternatively, given a known speed of a transmitted signal, the time of flight of the signal may be used to determine the distance the signal traveled from the time of transmission to the time of receipt. In such embodiments, the access point 106 may, for example, timestamp a transmitted packet for use in determining the reference distance. The reference distance between an access point 106, $AP_i$ and the computing device 102 may be represented herein as $DIST_{REF}(AP_i, CD)$ for simplicity.

Figure 4:
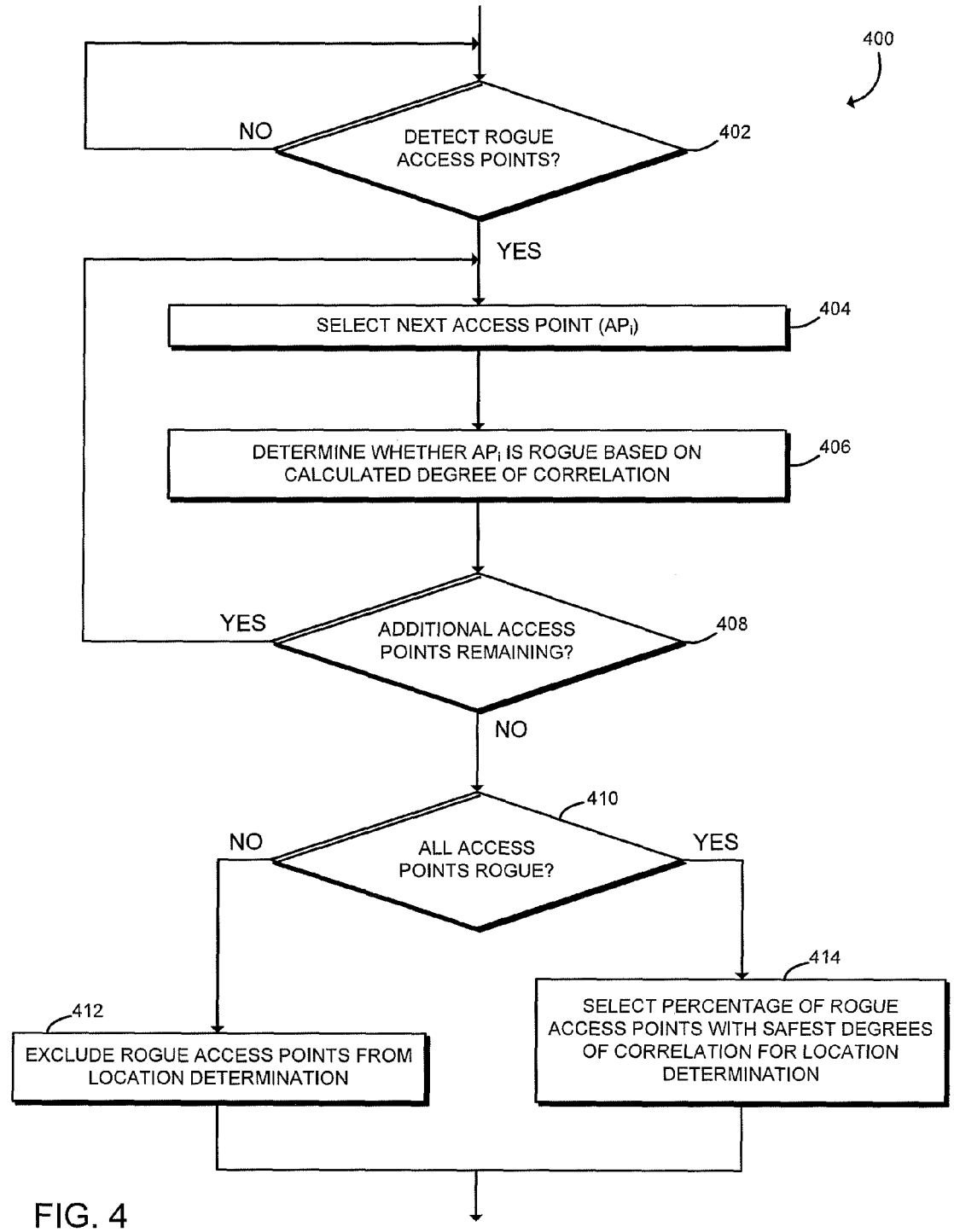
FIG. 4 is a simplified flow diagram of at least one embodiment of a method for identifying and excluding rogue access points based on a spatial distance and a reference distance on the computing device of the system of FIG. 1.

In block 314, the computing device 102 identifies and excludes rogue access points based on the spatial distances and the reference distances determined in blocks 310 and 312. To do so, the computing device 102 may execute a method 400 for identifying and excluding rogue access points as shown in FIG. 4. That is, the computing device 102 identifies which, if any, of the access points 106 are rogue access points and excludes them from use in trilateration and/or other location determining algorithms.

The illustrative method 400 begins with block 402 in which the computing device 102 determines whether to detect rogue access points. If so, the computing device 102 may determine whether each access point 106 is rogue by performing a rogue detection technique on the access point 106. As such, in block 404, the computing device 102 selects the next access point 106, $AP_i$. Of course, in the first iteration of block 404, the next access point 106 can be any of the access points 106, which may be randomly selected or selected using a suitable selection methodology. Upon selecting an access point 106, the computing device 102 determines whether the selected access point 106, $AP_i$, is rogue based on a degree of correlation calculated for the access point 106. In some embodiments, the degree of correlation represents a likelihood that the registered location of the access point 106, $AP_i$, is incorrect and that $AP_i$ is, therefore, a rogue access point. It should be appreciated that the degree of correlation may be calculated using any suitable algorithm or technique. For example, in the illustrative embodiment, the computing device 102 may execute a method 500 for calculating the degree of correlation of $AP_i$.

Figure 5:
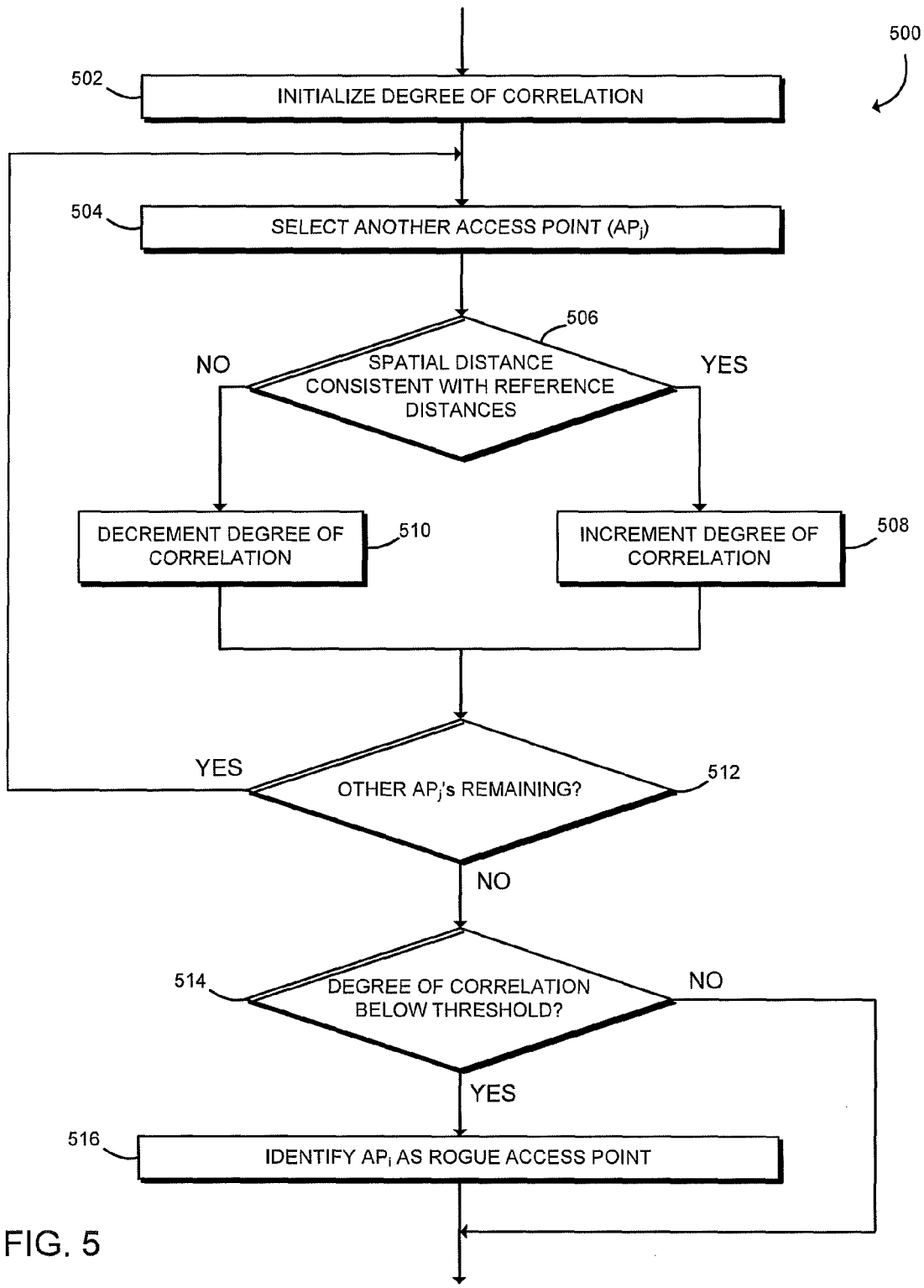
FIG. 5 is a simplified flow diagram of at least one embodiment of a method for determining whether an access point is rogue based on a calculated degree of correlation on the computing device of the system of FIG. 1.

The illustrative method 500 begins with block 502 in which the computing device 102 initializes the degree of correlation. That is, the degree of correlation is assigned a value (e.g., zero or one) as a base value, which may be later modified. Of course, in some embodiments, the degree of correlation may be determined without being initialized. In the illustrative embodiment, the degree of correlation is initialized to one, which is representative of the access point's correlation to itself. Further, it should be appreciated that the illustrative embodiment of FIG. 5 implements a scheme in which negative values indicate that a distance is inconsistent with other distances and therefore due to a rogue access point in the system 100. Of course, in other embodiments, another scheme may be used.

Upon initializing the degree of correlation, in block 504, the computing device 102 selects another access point 106, $AP_j$, other than the access point 106, $AP_i$, selected in block 404 of FIG. 4. In block 506, the computing device 102 determines whether the spatial distance between the access point 106, $AP_i$, and the access point 106, $AP_j$, based on the corresponding registered locations is consistent with the reference distances between the computing device 102 and each of $AP_i$ and $AP_j$ based on the transmitted signals. For example, the computing device 102 may determine whether the spatial distance between $AP_i$ and $AP_j$ satisfies the inequality:

$$\text{DIST}_{SPATIAL}(AP_i, AP_j) \leq \text{DIST}_{REF}(AP_i, CD) + \text{DIST}_{REF}(AP_j, CD).$$

In other words, the computing device 102 determines whether the spatial distance and the reference distances satisfy the triangle inequality, which states that the sum of the lengths of any two sides must be equal to or greater than the length of the other remaining side. More specifically, assuming the reference distance, $\text{DIST}_{REF}(AP_i, CD)$, between the computing device 102 and the access point 106, $AP_i$, and the reference distance, $\text{DIST}_{REF}(AP_j, CD)$, between the computing device 102 and the other access point 106, $AP_j$, are accurate, the spatial distance, $\text{DIST}_{SPATIAL}(AP_i, AP_j)$, must be less than or equal to the sum of those reference distances.

If the inequality is satisfied and/or the spatial distance is determined to be otherwise consistent with the reference distances, the computing device increments (e.g., by one) the degree of correlation in block 508. However, if the inequality is not satisfied, the computing device 102 decrements (e.g., by one) the degree of correlation in block 510. In block 512, the computing device 102 determines whether any other access points 106, $AP_j$, are remaining. If so, the method 500 returns to block 504 in which the computing device 102 selects another access point 106 other than those access points 106 previously selected. In other words, the computing device 102 determines whether the inequality discussed in regard to block 506 is satisfied for the spatial distance between the access point 106, $AP_i$, and each other access point 106, $AP_j$.

If no other access point 106, $AP_j$, remains, the computing device 102 determines, in block 514, whether the degree of correlation for the access point 106, $AP_i$, is below a threshold value. If the degree of correlation is below the threshold value, the computing device 102 identifies the access point 106, $AP_i$, as a rogue access point in block 516. Otherwise, $AP_i$ is treated as a secure, non-rogue or otherwise verified/validated access point 106. For example, in the illustrative embodiment, the threshold value is one. Accordingly, if the access point 106, $AP_i$, has a degree of correlation less than or equal to zero (equivalent to less than one in an integer-based system), the access point 106, $AP_i$, is treated as a rogue access point.

Referring back to FIG. 4, after determining whether the access point 106, $AP_i$, is rogue based on the degree of correlation in block 406, the computing device 102 determines whether additional access points 106 are remaining in block 408. If so, the method 400 returns to block 404 in which the computing device 102 selects the next access point 106, $AP_i$, other than those access points 106 already selected. In other words, the computing device 102 determines the degree of correlation for each access point 106 and determines whether the access point 106 is rogue based on the degree of correlation.

In block 410, the computing device 102 determines whether all of the access points 106 have been identified as rogue access points. If not, in block 412, the computing device 102 excludes the rogue access points from a determination of the location of the computing device 102. That is, any location determination algorithms (e.g., trilateration) exclude the rogue access points from their calculations. Instead, only the validated access points 106 (i.e., those not identified as rogue) are used in such calculations. As discussed above, excluding the rogue access points permits the location of the computing device 102 to be more accurately determined, which improves the utility of, for example, location-based services or applications. If all of the access points 106 are determined to be rogue access points, the situation is not ideal for determining the actual location of the computing device 102. However, in some embodiments, the computing device 102 selects a percentage (e.g., 50%) of the rogue access points for the location determination in block 414. For example, the computing device 102 may select the 50% of the rogue access points having the greatest degree of correlation. It should be appreciated that, in the illustrative embodiment, a rogue access point may be more likely to be safe for calculations than another rogue access point with a lesser degree of correlation. The percentage of rogue access points selected may be pre-established by the computing device 102 or may be generated based on characteristics of the access points 106. In another embodiment, the computing device 102 may prohibit location determination techniques if all of the access points 106 are identified as rogue access points.

Figure 6:
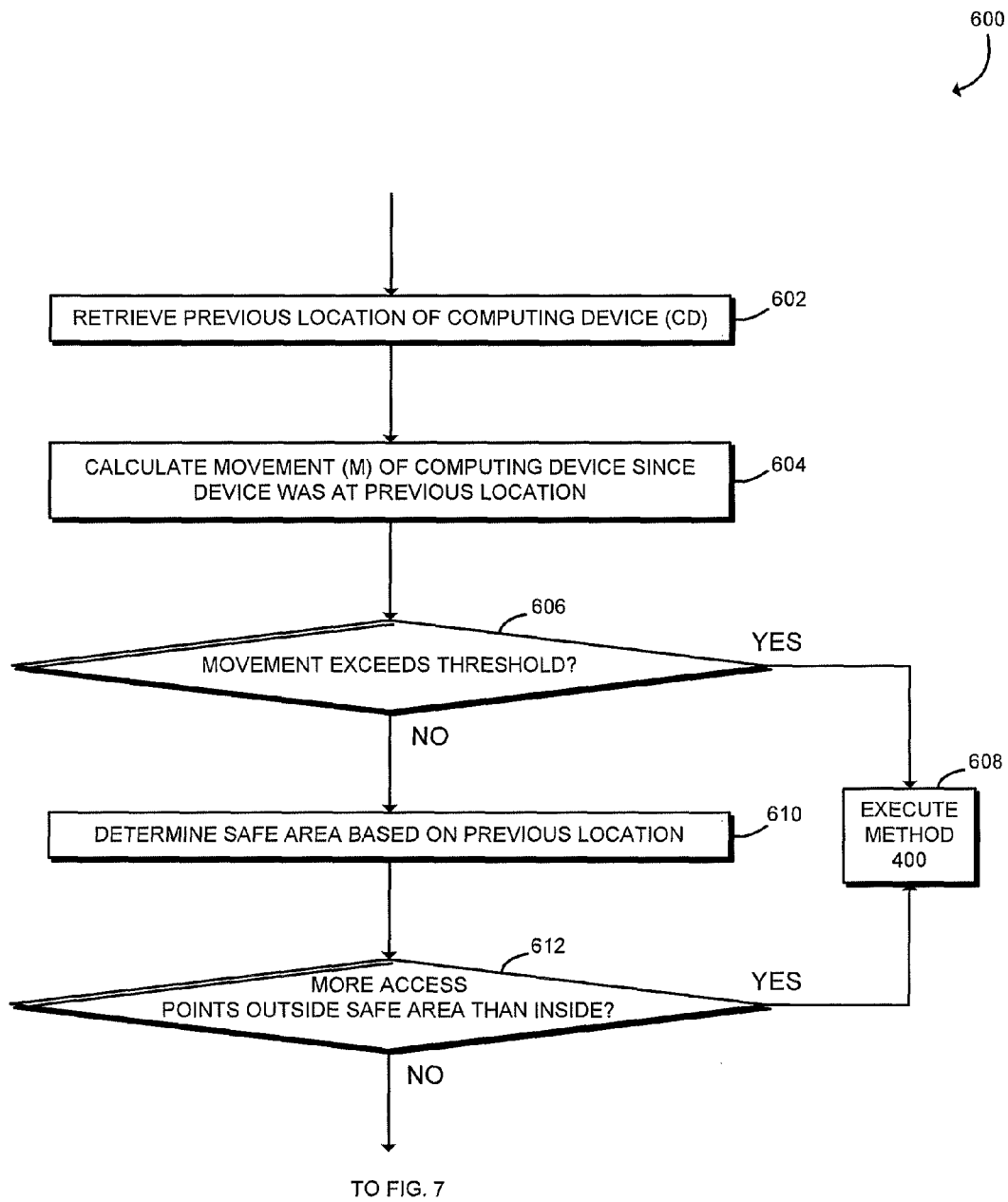
FIGS. 6 and 7 is a simplified flow diagram of at least one other embodiment of a method for identifying and excluding rogue access points based on a spatial distance and a reference distance on the computing device of the system of FIG. 1.
Figure 7:
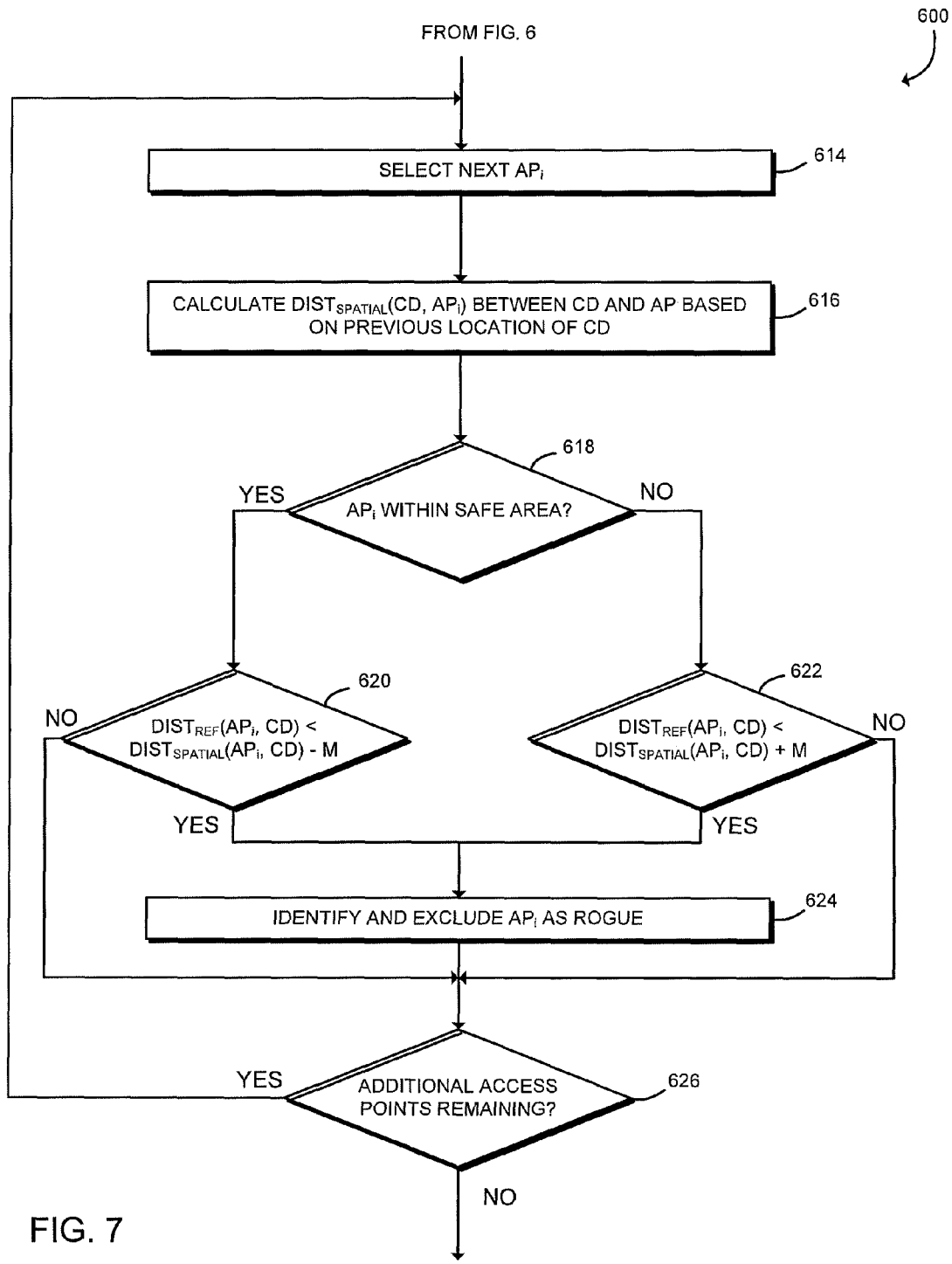

Referring back to FIG. 3, the computing device 102 identifies and excludes rogue access points in block 314. As discussed above, to do so, the computing device 102 may execute a method 400 as shown in FIG. 4. In another embodiment, the computing device 102 may execute a method 600 for identifying and excluding rogue access points as shown in FIGS. 6 and 7. As described below, the method 600 may consider one or more previous locations of the computing device 102 and possible movement of the computing device 102 since a time in which the computing device 102 was located at one of the previous locations (e.g., when the previous location data was stored). It should be appreciated that, in some embodiments, the method 600 decreases the number of computations required to determine whether the registered locations of the access points 106 are valid or rogue.

The illustrative method 600 begins with block 602 of FIG. 6 in which the computing device 102 retrieves the previous location of the computing device 102 from the location database 124. As discussed above, the computing device 102 may store location data regarding the location of the computing device 102 in the location database 124 after each round of trilateration or other location determination. Of course, in another embodiment, the previous location of the computing device 102 may be stored in an external location database 108.

In block 604, the computing device 102 calculates the movement or possible movement of the computing device 102 since the computing device 102 was at the previous location. It should be appreciated that the computing device 102 may determine the movement of the computing device 102 using any suitable means. As discussed above, the computing device 102 may use stored velocity data and/or derived data (e.g., average velocity) for the computing device 102 in conjunction with the amount of time elapsed since the computing device 102 was at the previous location (e.g., indicated by a time stamp) to determine the movement of the computing device 102. For example, a person carrying the computing device 102 may have moved an average speed of two meters-per-second as indicated via the sensors 120 since the previous location was recorded twenty seconds ago. Accordingly, in that time, the computing device 102 may have moved up to approximately 40 meters (2 m/s×20 s). Of course, the person may have simply walked in a circle, resulting in a positional displacement of zero. In another embodiment, the computing device 102 may calculate the movement or possible movement of the computing device 102 based on various other characteristics and/or metrics. For example, the possible movement may be calculated based on an average speed of something (e.g., human, plane, train, or automobile), based on a density of access points 106 near the computing device 102, and/or based on some other metric.

In block 606, the computing device 102 determines whether the calculated movement or possible movement of the computing device 102 exceeds a predetermined threshold. The threshold may be a static value (e.g., 10 meters) or a dynamic value (e.g., based on the access point 106 density or average velocity of the computing device 102) depending on the particular implementation. If the calculated movement exceeds the threshold, the computing device executes the method 400 in block 608 to determine whether the access points 106 are rogue access points based on the calculated degrees of correlation for each of the access points 106 as described above. If, however, the movement does not exceed the threshold, the computing device determines a safe area based on the previous location of the computing device 102 in block 610. Again, the safe area may be a static or dynamic value predetermined by the computing device 102. For example, the safe area may be defined as the area defined within the circle having the previous location of the computing device 102 as its center and a defined radius (e.g., 50 meters or two times the average distance between neighboring access points 106).

In block 612, the computing device 102 determines whether there is a greater number of access points 106 outside the safe area than inside the safe area. In doing so, the computing device 102 may, for each access point 106, compare the reference distance between the computing device 102 and the access point 106 with, for example, the radius defined by the safe area. In such an embodiment, a reference distance greater than the radius of the safe area indicates that the access point 106 is outside the safe area. Similarly, a reference distance less than the radius of the safe area indicates that the access point 106 is inside the safe area. If the computing device 102 determines that there are more access points 106 outside the safe area than inside the safe area, the computing device 102 executes the method 400 in block 608 to determine whether the access points 106 are rogue access points based on the calculated degrees of correlation for each of the access points 106 as described above.

Otherwise, the method 600 advances to block 614 of FIG. 7 in which the computing device 102 selects the next access point 106, $AP_i$. Of course, in the first iteration of block 614, the next access point 106 can be any of the access points 106. In block 616, the computing device 102 calculates the spatial distance, $DIST_{SPATIAL}(AP_i, CD)$, between the access point 106, $AP_i$, and the computing device 102 based on the previous location of the computing device 102, which may be calculated similar to the spatial distances between the access points 106 calculated above.

In block 618, the computing device 102 determines whether the access point 106, $AP_i$, is within the safe area. As described above, the computing device 102 may make such a determination based, for example, on the radius of the safe area and the reference distance between the computing device 102 and $AP_i$. Of course, other suitable means for determining whether $AP_i$ is in the safe area may be used in other embodiments. If the access point 106, $AP_i$, is determined to be within the safe area, in block 620, the computing device 102 determines whether the reference distance between the computing device (CD) 102 and the access point 106, $AP_i$, is less than the spatial distance between $AP_i$ and the previous location of the computing device 102 minus the possible movement (M) of the computing device 102 since the computing device 102 was located at the previous location. In other words, the computing device 102 determines whether the following inequality is satisfied:

$$DIST_{REF}(AP_i, CD) < DIST_{SPATIAL}(AP_i, CD) - M.$$

However, if the access point 106, $AP_i$, is outside the safe area, in block 622, the computing device 102 determines whether the reference distance between the computing device 102 and the access point 106, $AP_i$, is less than the sum of the possible movement of the computing device 102 and the spatial distance between $AP_i$ and the previous location of the computing device 102. That is, the computing device 102 determines whether the following inequality is satisfied:

$$DIST_{REF}(AP_i, CD) < DIST_{SPATIAL}(AP_i, CD) + M.$$

If the access point 106, $AP_i$, is within the safe area and the inequality of block 620 is satisfied, the computing device 102 identifies the access point 106, $AP_i$, as a rogue access point in block 624. Similarly, if the access point 106, $AP_i$, is outside the safe area and the inequality of block 622 is satisfied, the computing device 624 likewise identifies $AP_i$ as rogue in block 624. Otherwise, the access point 106, $AP_i$, is determined to be a valid access point 106 and may be used, for example, in trilateration procedures. Because the possible movement of the computing device 102 is never negative, it should be appreciated from blocks 618 through 624 that access points 106, $AP_i$, inside the safe area utilize a corresponding inequality that is easier to satisfy than that of those outside the safe area.

In block 626, the computing device 102 determines whether any additional access points 106, $AP_i$, remain. If so, the method 600 returns to block 614 in which the computing device 102 selects the next access point 106, $AP_i$. That is, the computing device 102 selects an access point 106 other than those already selected. As such, each of the access points 106 may be analyzed and those rogue access points identified and excluded. Referring back to FIG. 3, once the computing device 102 identifies and excludes the rogue access points (e.g., via the method 300 of FIG. 3 or the method 600 of FIGS. 6 and 7), the computing device 102 may determine the location of the computing device 102 based on the remaining valid access points 106. As discussed above, the computing device 102 may implement trilateration techniques or any other suitable means for doing so.

Although the methods described herein are directed to the computing device 102, the methods apply equally well to server-side applications. Additionally, the methods may be used on a database itself. For example, a server may implement the methods described herein, or a variation thereof, in order to filter rogue access points from, for example, a location database similar to the location database 108.

Figure 8:
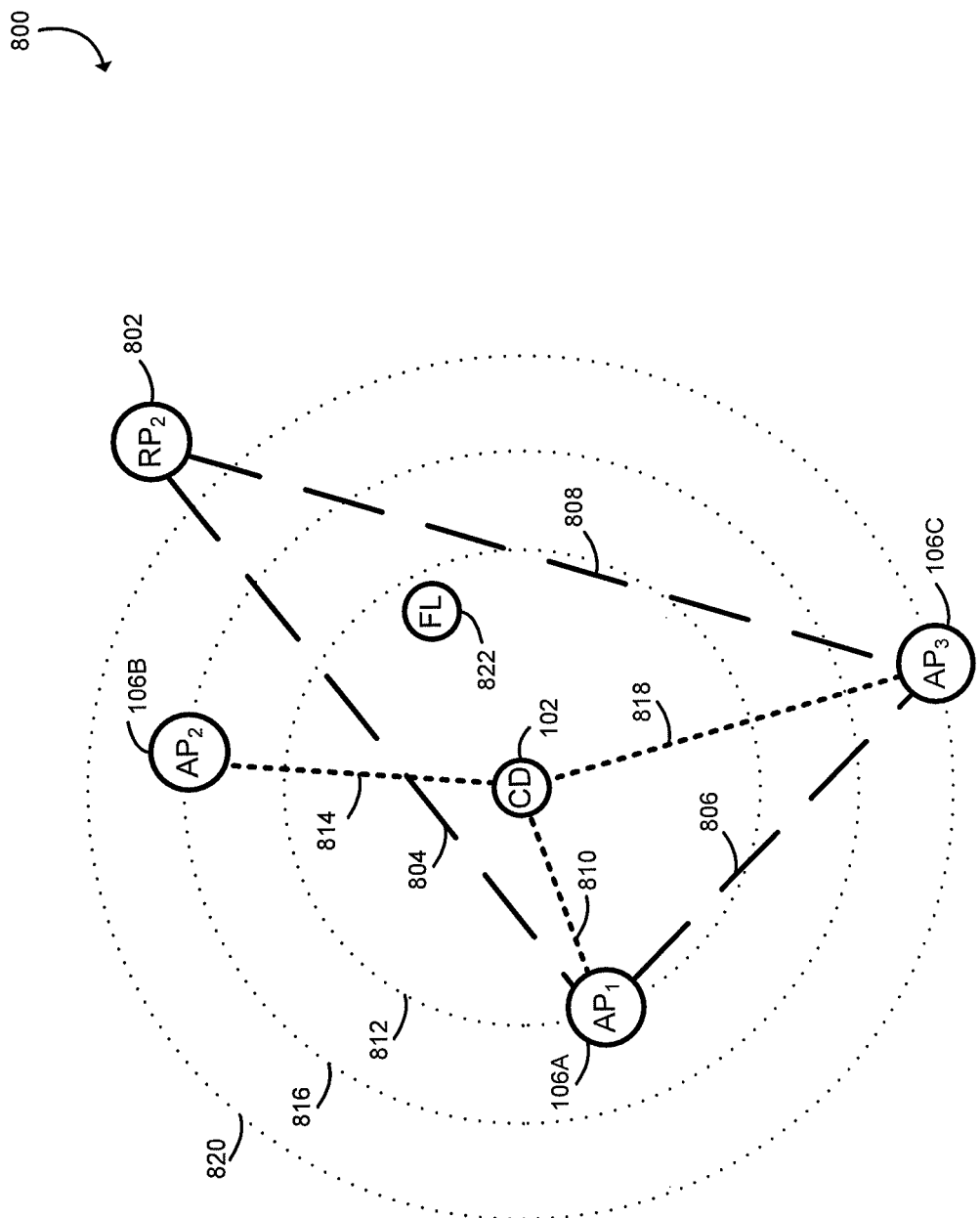
FIG. 8 is a simplified spatial diagram of at least one embodiment of the system of FIG. 1.

Referring now to FIG. 8, a simplified spatial diagram 800 of an embodiment of the system 100 is shown. In the illustrative embodiment, the computing device 102 and three access points 106 are shown. Specifically, access point 106A (AP$_1$), access point 106B (AP$_2$), and access point 106C (AP$_3$) are shown. As discussed above, an attacker may record erroneous data in the location database 108 corresponding to the location of the access point 106, send false beacon frames, or otherwise advertise a false location of the access point 106 (e.g., via IEEE 802.11v) thereby causing the access point 106 to be a rogue access point. FIG. 8 illustrates such an embodiment. In particular, rogue point 802 corresponds to the erroneous location data stored or otherwise provided for the access point 106B. It should be appreciated that the location of the computing device 102 may result in a false location 822 of the computing device 102 if the rogue point 802 is used in trilateration algorithms.

As discussed above, based on the registered locations of the access points 106A, 106C, the computing device 102 may determine the spatial distance 806 between the access points 106A, 106C. However, in determining the spatial distance 804 between the access points 106A, 106B, the location of the rogue point 802 (i.e., the registered location of the access point 106B) is used rather than the actual location of the access point 106B. Likewise, the location of the rogue point 802 is used in determining the spatial distance 808 between the access points 106B, 106C.

Additionally, the computing device 102 may determine the reference distance 810 between the computing device 102 and the access point 106A. Based on the reference distance 810, the computing device 102 may identify that the access point 106A is located somewhere along a circumference 812 but not the particular point on the circumference 812. Similarly, the computing device 102 may determine the reference distances 814, 818 and the corresponding circumferences 816, 820. As discussed above, armed with the reference distances 810, 814, 818 and the spatial distances 804, 806, 808, the computing device 102 may determine whether any of the access points 106A, 106B, 106C are rogue. For example, the computing device 102 may implement the method 400 of FIG. 4. In doing so, the computing device 102 determines the degree of correlation of the access point 106B. The degree of correlation results in the access point 106B being identified as a rogue access point because the inequality described in block 506 of FIG. 5 does not hold for the access point 106B, which can be seen in FIG. 8. Accordingly, the access point 106B would be excluded from location determination algorithms.

Examples

Illustrative examples of the technologies disclosed herein are provided below. An embodiment of the technologies may include any one or more, and any combination of, the examples described below.

Example 1 includes a computing device for identifying rogue access points having an actual location different from a registered location, the computing device comprising a communication module to receive a unique identifier of each access point of a plurality of access points within a communication range of the computing device from each access point; and a location determination module to (i) determine a registered physical location of each access point based on the unique identifier of each access point, (ii) determine a spatial distance between each access point and each other access point based on the registered physical location of each access point and each other access point, (iii) determine a reference distance between the computing device and each access point based on a transmitted signal received from each corresponding access point, (iv) and identify rogue access points based on the reference distance between the computing device and each access point and the spatial distance between each access point and each other access point.

Example 2 includes the subject matter of Example 1, and wherein the unique identifier comprises a media access control address of the corresponding access point.

Example 3 includes the subject matter of any of Examples 1 and 2, and wherein the communication module is to receive a beacon frame from each access point of the plurality of access points within the communication range, the beacon frame including the media access control address.

Example 4 includes the subject matter of any of Examples 1-3, and wherein to determine the registered physical location comprises to query a location database based on the unique identifier of each access point.

Example 5 includes the subject matter of any of Examples 1-4, and wherein the location determination module is further to determine a physical location of the computing device based on the registered physical location of access points of the plurality of access points other than the identified rogue access points.

Example 6 includes the subject matter of any of Examples 1-5, and wherein the location determination module is to execute a trilateration algorithm to determine the physical location of the computing device.

Example 7 includes the subject matter of any of Examples 1-6, and wherein to identify rogue access points comprises, for each access point, to calculate a degree of correlation based on a correlation between the registered physical location of each access point and the transmitted signal received by the computing device from each access point; and determine whether the access point is a rogue access point based on the calculated degree of correlation.

Example 8 includes the subject matter of any of Examples 1-7, and wherein the location determination module is further to exclude the rogue access points in a determination of a physical location of the computing device in response to an identification of an access point that is not a rogue access point.

Example 9 includes the subject matter of any of Examples 1-8, and wherein the location determination module is further to select a percentage of access points with highest degrees of correlation in response to an identification of each access point as a rogue access point.

Example 10 includes the subject matter of any of Examples 1-9, and wherein to calculate the degree of correlation comprises to initialize the degree of correlation and, for each other access point, to determine whether a spatial distance between the access point and the each other access point is greater than a sum of a reference distance between the access point and the computing device and a reference distance between the each other access point and the computing device; decrement the degree of correlation in response to a determination that the spatial distance between the access point and the each other access point is greater than the sum; and increment the degree of correlation in response to a determination that the spatial distance between the access point and the each other access point is not greater than the sum.

Example 11 includes the subject matter of any of Examples 1-10, and wherein the location determination module is to identify the access point as a rogue access point in response to a determination that the corresponding degree of correlation is below a threshold value.

Example 12 includes the subject matter of any of Examples 1-11, and wherein to identify rogue access points comprises, for each access point, to calculate the degree of correlation in response to a movement of the computing device exceeding a threshold value since being located at a previously recorded location.

Example 13 includes the subject matter of any of Examples 1-12, and wherein to identify rogue access points comprises, for each access point, to calculate the degree of correlation in response to an identification of more access points outside of a predetermined safe area than inside the predetermined safe area.

Example 14 includes the subject matter of any of Examples 1-13, and wherein the location determination module is to retrieve location data indicative of a previous location of the computing device at a first time; and calculate a movement of the computing device since the first time.

Example 15 includes the subject matter of any of Examples 1-14, and further including an inertial sensor to determine a velocity of the computing device, wherein the location determination module is to calculate the movement based on the velocity.

Example 16 includes the subject matter of any of Examples 1-15, and wherein to identify rogue access points comprises, for each access point, to determine a spatial distance between each access point and the previous location of the computing device.

Example 17 includes the subject matter of any of Examples 1-16, and wherein to identify rogue access points comprises, for each access point to determine a safe area for the access points based on the previous location of the computing device; determine whether the access point is inside the safe area; identify the access point as a rogue access point in response to a determination that (i) the access point is inside the safe area and (ii) a reference distance between the access point and the computing device is less than the calculated movement subtracted from a spatial distance between the access point and the computing device; and identify the access point as a rogue access point in response to a determination that (i) the access point is outside the safe area and (ii) a reference distance between the access point and the computing device is less than a sum of the calculated movement and the spatial distance between the access point and the computing device.

Example 18 includes the subject matter of any of Examples 1-17, and wherein the safe area is defined as an area within a predetermined radius of the previous location of the computing device.

Example 19 includes a method for identifying rogue access points on a computing device, the method comprising receiving, with the computing device, a unique identifier of each access point of a plurality of access points within a communication range of the computing device from each access point; determining, on the computing device, a registered physical location of each access point based on the unique identifier of each access point; determining, on the computing device, a spatial distance between each access point and each other access point based on the registered physical location of each access point and each other access point; determining, on the computing device, a reference distance between the computing device and each access point based on a transmitted signal receive from each corresponding access point; and identifying, on the computing device, rogue access points based on the reference distance between the computing device and each access point and the spatial distance between each access point and each other access point.

Example 20 includes the subject matter of Example 19, and wherein receiving the unique identifier comprises receiving a media access control address of the corresponding access point.

Example 21 includes the subject matter of any of Examples 19 and 20, and wherein receiving the unique identifier comprises receiving a beacon frame from each access point of the plurality of access points within the communication range, the beacon frame including the media access control address.

Example 22 includes the subject matter of any of Examples 19-21, and wherein determining the registered physical location comprises querying a location database based on the unique identifier of each access point.

Example 23 includes the subject matter of any of Examples 19-22, and further including determining, on the computing device, a physical location of the computing device based on the registered physical location of access points of the plurality of access points other than the identified rogue access points.

Example 24 includes the subject matter of any of Examples 19-23, and wherein determining the physical location comprises executing a trilateration algorithm.

Example 25 includes the subject matter of any of Examples 19-24, and wherein identifying the rogue access points comprises, for each access point calculating a degree of correlation based on a correlation between the registered physical location of each access point and the transmitted signal received by the computing device from each access point; and determining whether the access point is a rogue access point based on the calculated degree of correlation.

Example 26 includes the subject matter of any of Examples 19-25, and further including g excluding, on the computing device, the rogue access points in a determination of a physical location of the computing device in response to identifying an access point that is not a rogue access point.

Example 27 includes the subject matter of any of Examples 19-26, and, further including selecting, on the computing device, a percentage of access points with highest degrees of correlation in response to identifying each access point as a rogue access point.

Example 28 includes the subject matter of any of Examples 19-27, and wherein calculating the degree of correlation comprises initializing the degree of correlation and, for each other access point determining whether a spatial distance between the access point and the each other access point is greater than a sum of a reference distance between the access point and the computing device and a reference distance between the each other access point and the computing device; decrementing the degree of correlation in response to a determination that the spatial distance between the access point and the each other access point is greater than the sum; and incrementing the degree of correlation in response to a determination that the spatial distance between the access point and the each other access point is not greater than the sum.

Example 29 includes the subject matter of any of Examples 19-28, and wherein identifying the access point as a rogue access point comprises identifying the access point as a rogue access point in response determining that the corresponding degree of correlation is below a threshold value.

Example 30 includes the subject matter of any of Examples 19-29, and wherein identifying rogue access points comprises, for each access point, calculating the degree of correlation in response to a movement of the computing device exceeding a threshold value since being located at a previously recorded location.

Example 31 includes the subject matter of any of Examples 19-30, and wherein identifying rogue access points comprises, for each access point, calculating the degree of correlation in response to identifying more access points outside of a predetermined safe area than inside the predetermined safe area.

Example 32 includes the subject matter of any of Examples 19-31, and further including retrieving, with the computing device, location data indicative of a previous location of the computing device at a first time; and calculating, on the computing device, a movement of the computing device since the first time.

Example 33 includes the subject matter of any of Examples 19-32, and further including determining, on the computing device, a velocity of the computing device, wherein calculating the movement of the computing device comprises calculating a movement of the computing device based on the determined velocity of the computing device.

Example 34 includes the subject matter of any of Examples 19-33, and wherein identifying rogue access points comprises, for each access point, determining a spatial distance between each access point and the previous location of the computing device.

Example 35 includes the subject matter of any of Examples 19-34, and wherein identifying rogue access points comprises, for each access point determining a safe area for the access points based on the previous location of the computing device; determining whether the access point is inside the safe area; identifying the access point as a rogue access point in response to determining that (i) the access point is inside the safe area and (ii) a reference distance between the access point and the computing device is less than the calculated movement subtracted from a spatial distance between the access point and the computing device; and identifying the access point as a rogue access point in response to determining that (i) the access point is outside the safe area and (ii) a reference distance between the access point and the computing device is less than a sum of the calculated movement and the spatial distance between the access point and the computing device.

Example 36 includes the subject matter of any of Examples 19-35, and wherein determining the safe area comprises setting a safe area as an area within a predetermined radius of the previous location of the computing device.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device for identifying rogue access points, the computing device comprising means for performing the method of any of Examples 19-36.

The invention claimed is:

1. A computing device for identifying rogue access points having an actual location different from a registered location, the computing device comprising:
a communication module to receive a unique identifier of each access point of a plurality of access points within a communication range of the computing device from each access point; and
a location determination module to (i) determine a registered physical location of each access point based on the unique identifier of each access point, (ii) determine a spatial distance between each access point and each other access point based on the registered physical location of each access point and each other access point, (iii) determine a reference distance between the computing device and each access point based on a transmitted signal received from each corresponding access point, (iv) identify rogue access points based on the reference distance between the computing device and each access point and the spatial distance between each access point and each other access point, and (v) determine a physical location of the computing device with a trilateration algorithm, based on the identification of the rogue access points.

2. The computing device of claim 1, wherein the communication module is to receive a beacon frame from each access point of the plurality of access points within the communication range, the beacon frame including a media access control address; and
wherein the unique identifier comprises the media access control address of the corresponding access point.

3. The computing device of claim 2, wherein to determine the registered physical location comprises to query a location database based on the unique identifier of each access point.

4. The computing device of claim 1, wherein the location determination module is further to determine the physical location of the computing device based on the registered physical location of access points of the plurality of access points other than the identified rogue access points.

5. The computing device of claim 1, wherein to identify rogue access points comprises, for each access point, to:
calculate a degree of correlation based on a correlation between the registered physical location of each access point and the transmitted signal received by the computing device from each access point; and
determine whether the access point is a rogue access point based on the calculated degree of correlation.

6. The computing device of claim 5, wherein the location determination module is further to exclude the rogue access points in a determination of a physical location of the computing device in response to an identification of an access point that is not a rogue access point.

7. The computing device of claim 5, wherein to calculate the degree of correlation comprises to initialize the degree of correlation and, for each other access point, to:
determine whether a spatial distance between the access point and the each other access point is greater than a sum of a reference distance between the access point and the computing device and a reference distance between the each other access point and the computing device;

decrement the degree of correlation in response to a determination that the spatial distance between the access point and the each other access point is greater than the sum; and increment the degree of correlation in response to a determination that the spatial distance between the access point and the each other access point is not greater than the sum.

8. The computing device of claim 7, wherein the location determination module is to identify the access point as a rogue access point in response to a determination that the corresponding degree of correlation is below a threshold value.

9. One or more non-transitory machine readable storage media comprising a plurality of instructions stored thereon that, in response to execution by a computing device, cause the computing device to:

receive a unique identifier of each access point of a plurality of access points within a communication range of the computing device from each access point;

determine a registered physical location of each access point based on the unique identifier of each access point;

determine a spatial distance between each access point and each other access point based on the registered physical location of each access point and each other access point;

determine a reference distance between the computing device and each access point based on a transmitted signal receive from each corresponding access point; and identify rogue access points based on the reference distance between the computing device and each access point and the spatial distance between each access point and each other access point; and determine a physical location of the computing device with a trilateration algorithm, based on the identification of the rogue access points.

10. The one or more non-transitory machine readable storage media of claim 9, wherein to determine the registered physical location comprises to query a location database based on the unique identifier of each access point.

11. The one or more non-transitory machine readable storage media of claim 9, wherein to identify the rogue access points comprises, for each access point, to:

calculate a degree of correlation based on a correlation between the registered physical location of each access point and the transmitted signal received by the computing device from each access point; and determine whether the access point is a rogue access point based on the calculated degree of correlation.

12. The one or more non-transitory machine readable storage media of claim 10, further comprising instructions stored thereon that cause the computing device to exclude the rogue access points in a determination of the physical location of the computing device in response to identification of an access point that is not a rogue access point.

13. The one or more non-transitory machine readable storage media of claim 10, wherein to calculate the degree of correlation comprises to initialize the degree of correlation and, for each other access point, to:

determine whether a spatial distance between the access point and the each other access point is greater than a sum of a reference distance between the access point and the computing device and a reference distance between the each other access point and the computing device;

decrement the degree of correlation in response to a determination that the spatial distance between the access point and the each other access point is greater than the sum; and increment the degree of correlation in response to a determination that the spatial distance between the access point and the each other access point is not greater than the sum.

14. The one or more non-transitory machine readable storage media of claim 12, wherein to identify the access point as a rogue access point comprises to identify the access point as a rogue access point in response to a determination that the corresponding degree of correlation is below a threshold value.

15. The one or more non-transitory machine readable storage media of claim 10, wherein to identify rogue access points comprises, for each access point, to calculate the degree of correlation in response to at least one of (i) a movement of the computing device exceeding a threshold value since being located at a previously recorded location or (ii) an identification of more access points outside of a predetermined safe area than inside the predetermined safe area.

16. The one or more non-transitory machine readable storage media of claim 9, further comprising instructions stored thereon that cause the computing device to:

retrieve location data indicative of a previous location of the computing device at a first time; and calculate a movement of the computing device since the first time.

17. The one or more non-transitory machine readable storage media of claim 15, wherein to identify rogue access points comprises, for each access point, to determine a spatial distance between each access point and the previous location of the computing device.

18. The one or more non-transitory machine readable storage media of claim 16, wherein to identify rogue access points comprises, for each access point, to:

determine a safe area for the access points based on the previous location of the computing device, the safe area being an area defined within a predetermined radius of the previous location of the computing device;

determine whether the access point is inside the safe area;

identify the access point as a rogue access point in response to a determination that (i) the access point is inside the safe area and (ii) a reference distance between the access point and the computing device is less than the calculated movement subtracted from a spatial distance between the access point and the computing device; and identify the access point as a rogue access point in response to a determination that (i) the access point is outside the safe area and (ii) a reference distance between the access point and the computing device is less than a sum of the calculated movement and the spatial distance between the access point and the computing device.

19. A method for identifying rogue access points on a computing device, the method comprising:

receiving, with the computing device, a unique identifier of each access point of a plurality of access points within a communication range of the computing device from each access point;

determining, on the computing device, a registered physical location of each access point based on the unique identifier of each access point;

determining, on the computing device, a spatial distance between each access point and each other access point based on the registered physical location of each access point and each other access point;

determining, on the computing device, a reference distance between the computing device and each access point based on a transmitted signal receive from each corresponding access point;

identifying, on the computing device, rogue access points based on the reference distance between the computing device and each access point and the spatial distance between each access point and each other access point; and determining, on the computing device, a physical location of the computing device with a trilateration algorithm, based on the identification of the rogue access points.

20. The method of claim 18, wherein determining the registered physical location comprises querying a location database based on the unique identifier of each access point.

21. The method of claim 18, wherein identifying the rogue access points comprises, for each access point:

calculating a degree of correlation based on a correlation between the registered physical location of each access point and the transmitted signal received by the computing device from each access point; and determining whether the access point is a rogue access point based on the calculated degree of correlation.

22. The method of claim 20, wherein calculating the degree of correlation comprises initializing the degree of correlation and, for each other access point:

determining whether a spatial distance between the access point and the each other access point is greater than a sum of a reference distance between the access point and the computing device and a reference distance between the each other access point and the computing device;

decrementing the degree of correlation in response to a determination that the spatial distance between the access point and the each other access point is greater than the sum; and incrementing the degree of correlation in response to a determination that the spatial distance between the access point and the each other access point is not greater than the sum.

23. The method of claim 20, wherein identifying rogue access points comprises, for each access point, calculating the degree of correlation in response to at least one of (i) a movement of the computing device exceeding a threshold value since being located at a previously recorded location or (ii) identifying more access points outside of a predetermined safe area than inside the predetermined safe area.

* * * * *